United States Patent [19]
Chang et al.

[11] Patent Number: 5,359,719
[45] Date of Patent: Oct. 25, 1994

[54] ADDRESS RANGE SETTING METHOD AND APPARATUS FOR A COMPUTER EXPANSION CARD

[75] Inventors: Jack Chang; Ching-Bang Lu, both of Hsinchu, Taiwan

[73] Assignee: Winbond Electronic Corp., Hsinchu, Taiwan

[21] Appl. No.: 946,663

[22] Filed: Sep. 18, 1992

[51] Int. Cl.$^5$ .............................. G06F 12/00
[52] U.S. Cl. .................................... 395/400
[58] Field of Search ............... 395/400, 425

[56] References Cited

U.S. PATENT DOCUMENTS 5,218,684 6/1993 Hayes et al. .................. 395/400

Primary Examiner—David L. Robertson
Attorney, Agent, or Firm—Harness, Dickey & Pierce

[57] ABSTRACT

In a method and apparatus for setting an address range for a computer expansion card of a computer system, the computer system is first controlled so as to execute a write operation which involves a series of addresses within the address range to be assigned to the computer expansion card. A linear feedback shift register receives the series of addresses from address lines of the computer system and derives a code output from the series of addresses. A code detecting unit receives the code output of the linear feedback shift register and compares the code output with a predetermined code. The code detecting unit generates a match signal whenever the code output matches with the predetermined code. An address register is activated by the match signal so as to store most significant bits of the address range to be assigned to the computer expansion card therein. The most significant bits are common to all of the addresses within the address range.

3 Claims, 3 Drawing Sheets

ADDRESS RANGE SETTING METHOD AND APPARATUS FOR A COMPUTER EXPANSION CARD

BACKGROUND OF THE INVENTION

1. Field of the Invention

The invention relates to an address range setting method, more particularly to an address range setting method and apparatus to set an address range for a computer expansion card of a computer system.

2. Description of the Related Art

Presently, different peripheral equipments and subsystems are available to enable a computer system to accomplish different functions. These equipments and subsystems often require one or more address ranges so as to permit the central processing unit (CPU) of the computer system to access the same.

Generally, the peripheral equipments and subsystems are not provided with a fixed address range when manufactured. Since there is a wide variety of such equipments and subsystems available, it would be virtually impossible to assign a constant address range for each type of peripheral equipment or subsystem when the latter is manufactured.

When incorporating the peripheral equipment or subsystem in a computer system, it is important to note that all of the addresses within the address range which is to be assigned thereto should be available and should not have been previously assigned to another peripheral equipment or subsystem, thereby ensuring proper operation of the computer system.

Conventional peripheral equipments and subsystems are usually provided with a jumper means which is operable so as to set an address range for the same. Note that the jumper means is relatively inconvenient to install. Furthermore, changes in the assigned address range cannot be easily achieved when the jumper means is employed. In addition, the jumper means is loosely mounted on the peripheral equipment or subsystem, thereby resulting in the untimely detachment of the former from the latter.

SUMMARY OF THE INVENTION

Therefore, the objective of the present invention is to provide an address range setting method and apparatus for a computer expansion card of a computer system, which method and apparatus can be used to set an address range for the computer expansion card while overcoming the above-mentioned drawbacks that are commonly associated with the prior art.

Accordingly, the address range setting apparatus of the present invention is used to set an address range for a computer expansion card of a computer system and comprises:

a programmed means for controlling the computer system to execute a write operation which involves a series of addresses within the address range to be assigned to the computer expansion card;

a linear feedback shift register means adapted to receive the series of addresses from address lines of the computer system and deriving a code output from the series of addresses;

a code detecting unit receiving the code output of the linear feedback shift register means and comparing the code output with a predetermined code, said code detecting unit generating a match signal whenever the code output matches with the predetermined code;

an address register activated by the match signal so as to store most significant bits of the address range to be assigned to the computer expansion card therein, said most significant bits being common to all addresses within the address range; and an address comparator having a first set of inputs receiving the most significant bits of the address range from the address register and a second set of inputs receiving most significant bits of an address to be accessed by the computer system from the address lines of the computer system, said address comparator generating a select signal which is used to enable the computer expansion card and permit the computer system to access the computer expansion card when the first set of inputs matches with the second set of inputs.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
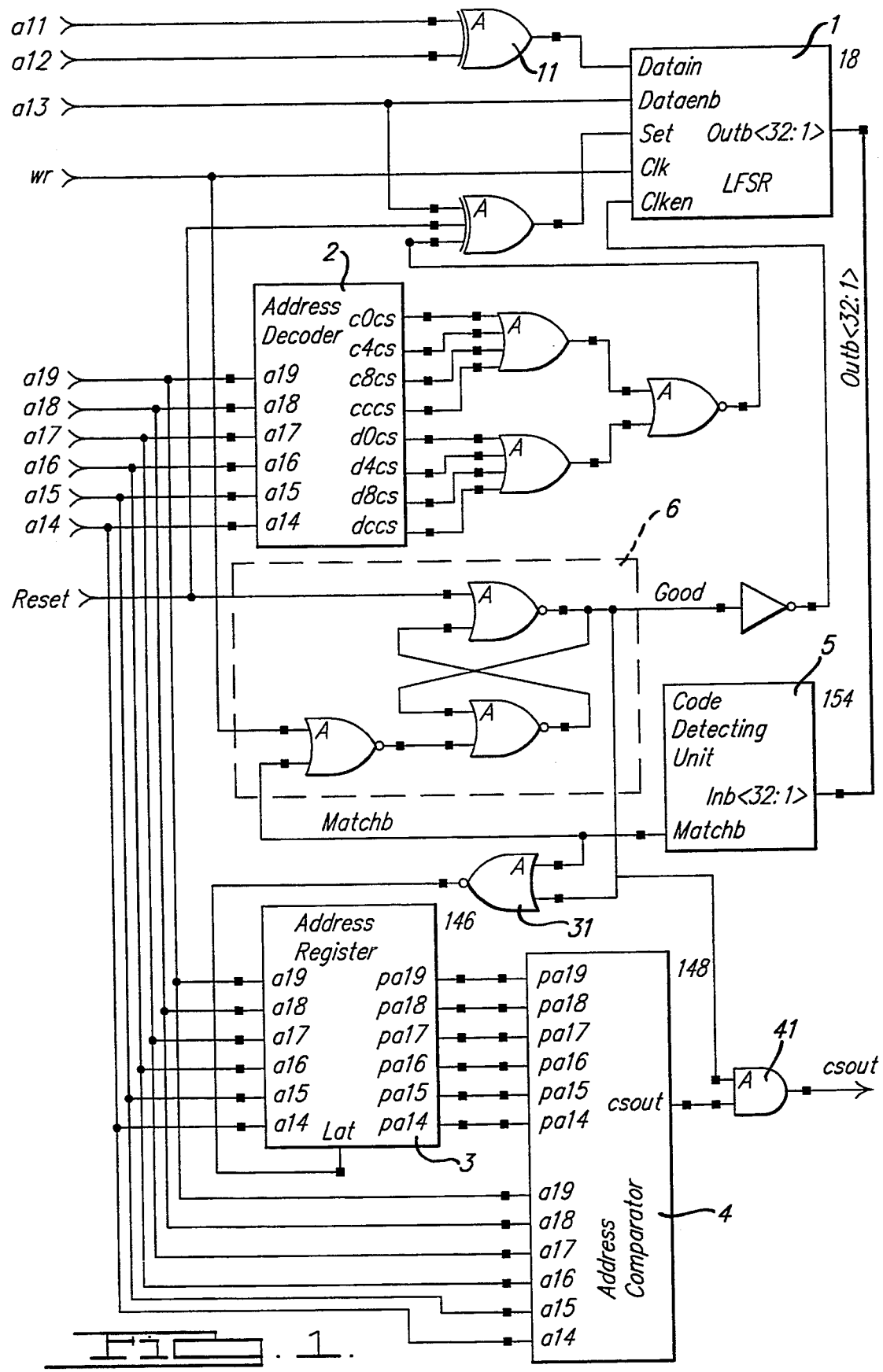
FIG. 1 is a schematic electrical circuit diagram of the preferred embodiment of an address setting apparatus according to the present invention.

Referring to FIG. 1, the preferred embodiment of an address range setting apparatus according to the present invention is shown to comprise a linear feedback shift register (LFSR) (1), an address decoder (2), an address register (3), an address comparator (4) and a code detecting unit (5).

The LFSR (1) generates a predetermined code whenever an address range setting operation is conducted. The address decoder ( 2 ) is used to detect if an input address present at the address lines of the computer system is within one of eight predetermined address ranges. The address register (3) is used to store the most significant bits of the address range to be assigned to the computer expansion card which is used with the present invention. The address comparator (4) compares the contents of the address register (3) with the input address present at the address lines and generates a select signal (csout) when the input address is within the address range to be assigned. Finally, the code detecting unit (5) is used to detect if the code output of the LFSR (1) is the predetermined code.

Note that the input signals to the preferred embodiment include the input address present at the address lines (a0-a19) of the address bus, the write (wr) signal and the RESET signal. A write operation, which involves a series of input addresses within the address range to be assigned to the computer expansion card, is executed whenever an address range setting operation is conducted.

If the preferred embodiment is to be used with an IBM personal computer, there are eight address ranges which are available for use by peripheral equipments or subsystems. These address ranges are C0000–C3FFF, C4000–C7FFF, C8000–CBFFF, CC000–CFFFF, D0000-D3FFF, D4000-D7FFF, D8000-DBFFF, and DC000-DFFFF. Each of the above address ranges includes more than 16,000 addresses. Assuming that the address range C8000-CBFFF is to be assigned to a computer interface card, the computer system is controlled by a computer program so as to store the address range C8000-CBFFF in the address register (3) of the preferred embodiment whenever the computer system is activated. Therefore, whenever the computer system accesses said computer interface card, the address comparator (4) generates the select signal (csout) which is used to enable the computer interface card, thereby permitting access to the latter. The peripheral equipments and/or subsystems connected to the remaining seven address ranges are unable to receive the select signal (csout).

Figure 2:
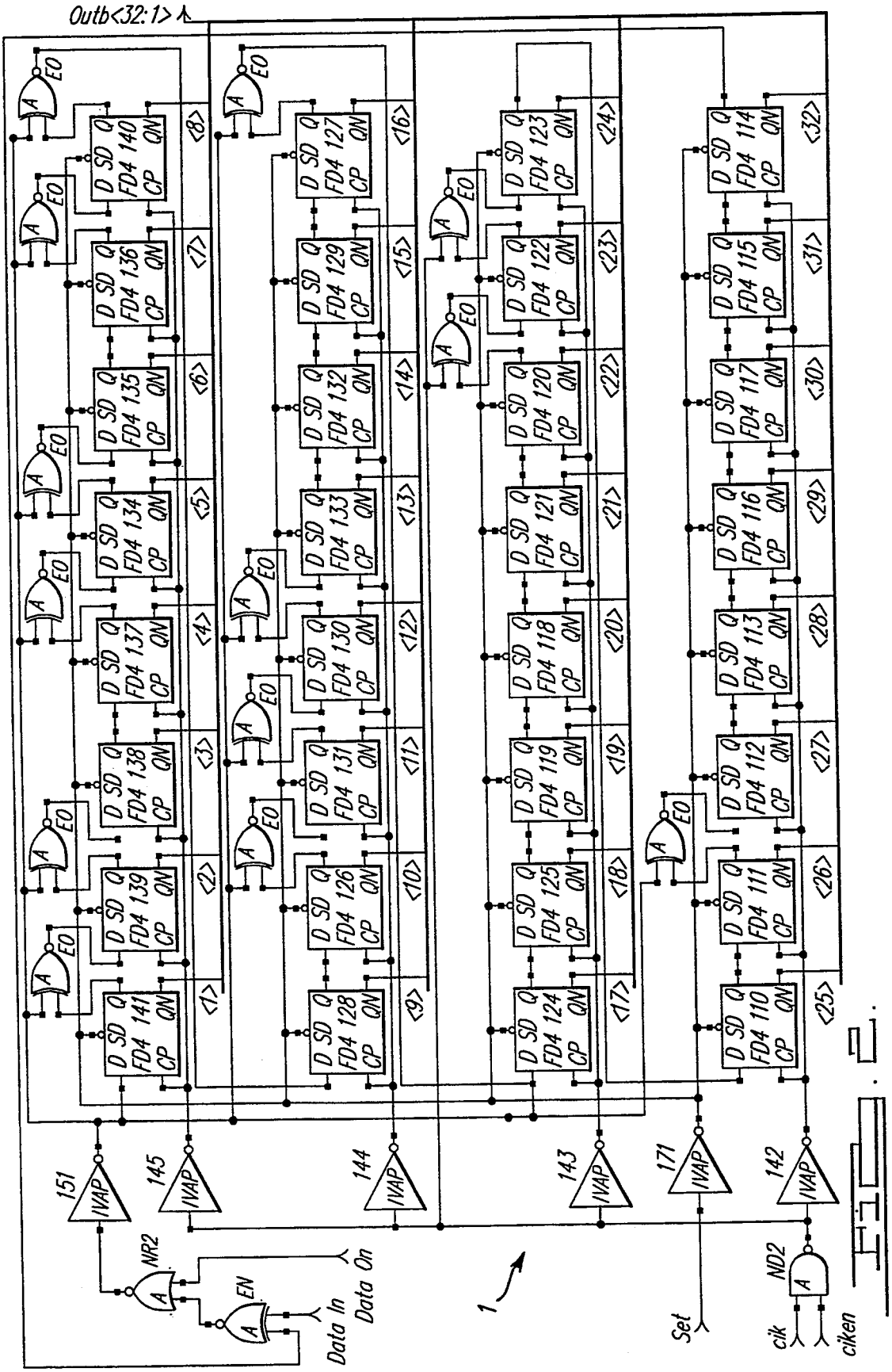
FIG. 2 is a schematic electrical circuit diagram of a linear feedback shift register of the preferred embodiment.

The following is a more detailed description of the operation of the address range setting apparatus of the present invention:

The computer system generates the RESET signal when activated. The output of the LFSR (1) is reset to 0, and a clock enable input (clken) to the same is at a low logic state, thereby enabling the LFSR (1) to receive inputs from the address lines (a13-a11) of the address bus. A schematic electrical circuit diagram of the LFSR (1) is shown in FIG. 2. The data input line (datain) of the LFSR (1) is connected to the output terminal of an XOR gate (11). The inputs of the XOR gate (11) are connected to the address lines (a11, a12). The write (wr) signal serves as a clock input to the LFSR (1). In the preferred embodiment, the address line (a13) should be in a low logic state before the LFSR (1) can receive input data. The LFSR (1) is in a reset state when the address line (a13) is in a high logic state. The LFSR (1) is similarly in a reset state whenever the input address from the address bus of the computer system is not within the eight predetermined address ranges.

A write operation, which involves a series of input addresses within the address range to be assigned to the computer expansion card, is then executed. If the write operation has been properly completed, the LFSR (1) should have provided a 32-bit predetermined code [outb<32:1>] to the code detecting unit (5). The output (matchb) of the code detecting unit (5) then changes to a low logic state to indicate that the code detecting unit (5) has received the predetermined code from the LFSR (1). The output (matchb) of the code detecting unit (5) and the write (wr) signal are received by a logic circuit (6). The output (good) of the logic circuit (6) changes to a high logic state whenever the output (matchb) of the code detecting unit (5) is in the low logic state. The output (good) is inverted and serves as the clock enable input (clken) to the LFSR (1). The output (good) disables the LFSR (1) once the code detecting unit (5) has received the predetermined code from the LFSR (1). The output (good) of the logic circuit (6) and the output (matchb) of the code detecting unit (5) serve as inputs to a NOR gate (31). The NOR gate (31) controls the address register (3) so as to store the address signals at the address lines (a19-a14) therein, which address signals being most significant bits of the address range to be assigned and being common to all addresses within the address range. The address range setting operation has thus been completed.

The address comparator (4) has a first set of inputs (pa19-pa14) which receives the contents of the address register (3) and a second set of inputs (a19-a14) which receives most significant bits of an address to be accessed by the computer system. The computer expansion card which is connected to the address range setting apparatus of the present invention is enabled by the select signal output (csout) of the address comparator (4) whenever the first set of inputs (pa19-pa14) matches with the second set of inputs (a19-a14). Note that the csout pin of the address comparator (4) and the output (good) of the logic circuit (6) serve as inputs to an AND gate (41). If the address range setting operation has not yet been completed, the output (good) of the logic circuit (6) is in a low logic state and thus, the select signal output (csout) of the preferred embodiment is similarly in a low logic state. It has thus been shown that the address range setting operation does not affect the operation of the peripheral equipment or subsystem which is connected to the computer expansion card that is in use.

In the preferred embodiment, the LFSR (1) is a 32-bit linear feedback shift register, although 12-bit or 16-bit linear feedback shift registers may also be used. The LFSR (1) used in the preferred embodiment is represented by the following polynomial function (Y):

$$Y = X^{32} + X^{26} + X^{23} + X^{22} + X^{16} + X^{12} + X^{11} + X^{10} + X^8 + X^7 + X^5 + X^4 + X^2 + X + 1.$$

The LFSR (1) is known in the art and thus, a detailed description of the construction and operation of the same will not be provided herein. The operation of the LFSR (1) is substantially similar to algebraic division, wherein the polynomial function (Y) which represents the LFSR (1) serves as the dividend while the address input to the LFSR (1) serves as the divisor and is represented by the following polynomial function (z):

$$Z = a_n X^n + a_{n-1} X^{n-1} + a_{n-2} X^{n-2} + \ldots + a_1 X^1 + a_0 X^0 \cdot [a_m = 0 \text{ or } 1 \ (0 \leq m \leq n)]$$

The output of the LFSR (1) is the remainder of the quotient of (Z)/(Y). The code detecting unit (5) is configured so as to detect if the output of the LFSR (1) is the predetermined code which is obtained after a write operation that involves a series of input addresses has been properly executed. In the preferred embodiment, the write operation involves a series of 1024 addresses. Of course, a longer series of addresses may be employed so as to minimize further the occurrence of an untimely address range setting operation.

Figure 3:
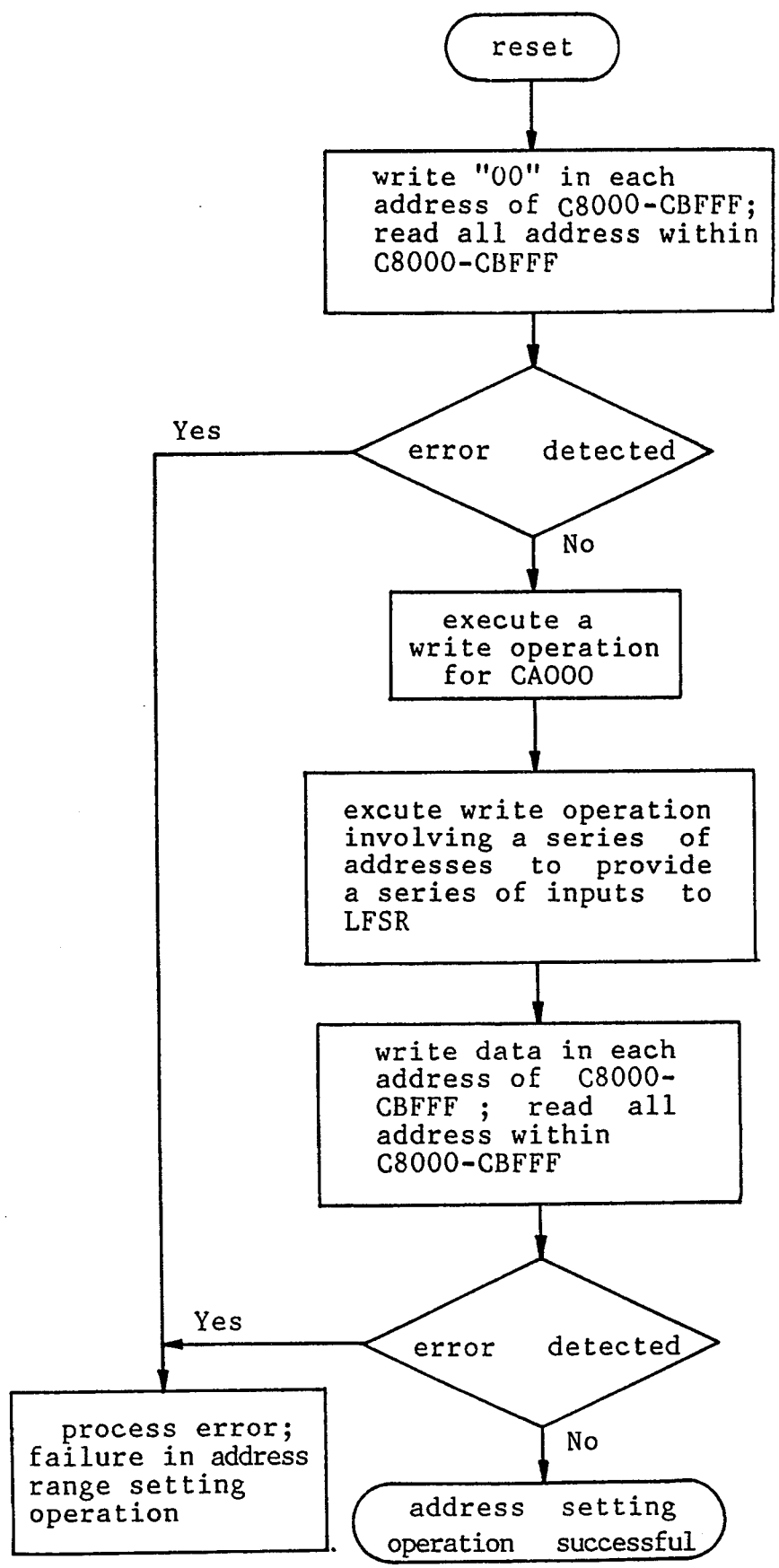
FIG. 3 is a flowchart of a computer program which is used with the preferred embodiment.

FIG. 3 is a flowchart of the computer program which is employed in the present invention. The computer program basically controls the computer system to execute the following steps:

1. All peripheral equipments and subsystems connected to the computer system are reset when the computer system is activated. The address range setting apparatus of the present invention is similarly reset.

2. If the address range C8000-CBFFF is to be assigned to a computer expansion card, the computer system executes a first write operation so as to verify if all of the addresses within the chosen address range are unassigned. A logic 0 is written into each of the addresses within the chosen address range. All of the addresses within the chosen address range are then read. If the address is unassigned, the computer system should be able to detect a logic 1, indicating that the data bus is in a high impedance state, instead of a logic 0.

3. A second write operation is executed for the input address CA000. The address line (a13) is at a high logic state, thereby placing the LFSR (1) in a reset state.

4. A third write operation, which involves a series of input addresses with in the chosen address range, is then executed so as to provide a series of inputs to the LFSR (1). If the third write operation was properly executed, the address signals present at address lines (a19–a14), which happen to be the most significant bits common to all addresses within the address range C8000–CBFFF, are then stored in the address register (3).

5. In order to verify whether the address range setting operation has been successfully completed, an optional fourth write operation, similar to the first write operation, is executed. All of the addresses within the selected address range are then read so as to verify the accuracy of the data present thereat.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method for setting an address range for a computer expansion card of a computer system, comprising the steps:

controlling the computer system to execute a write operation which involves a series of addresses within the address range to be assigned to the computer expansion card;

providing a linear feedback shift register means which is adapted to receive said series of addresses from address lines of said computer system and which derives a code output from said series of addresses;

providing a code detecting unit which receives said code output of said linear feedback shift register means and which compares said code output with a predetermined code, said code detecting unit generating a match signal whenever said code output matches with said predetermined code; and providing an address register which is activated by said match signal so as to store most significant bits of the address range to be assigned to the computer expansion card therein, said most significant bits being common to all addresses within the address range.

2. The method as claimed in claim 1, further comprising the step:

providing an address comparator which has a first set of inputs that receives said most significant bits of the address range from said address register and a second set of inputs that receives most significant bits of an address to be accessed by the computer system from the address lines of the computer system, said address comparator generating a select signal which is used to enable the computer expansion card and permit the computer system to access the computer expansion card when said first set of inputs matches with said second set of inputs.

3. An address range setting apparatus for setting an address range for a computer expansion card of a computer system, comprising:

a programmed means for controlling the computer system to execute a write operation which involves a series of addresses within the address range to be assigned to the computer expansion card;

a linear feedback shift register means adapted to receive said series of addresses from address lines of said computer system and deriving a code output from said series of addresses;

a code detecting unit receiving said code output of said linear feedback shift register means and comparing said code output with a predetermined code, said code detecting unit generating a match signal whenever said code output matches with said predetermined code;

an address register activated by said match signal so as to store most significant bits of the address range to be assigned to the computer expansion card therein, said most significant bits being common to all addresses within the address range; and an address comparator having a first set of inputs receiving said most significant bits of the address range from said address register and a second set of inputs receiving most significant bits of an address to be accessed by the computer system from the address lines of the computer system, said address comparator generating a select signal which is used to enable the computer expansion card and permit the computer system to access the computer expansion card when said first set of inputs matches with said second set of inputs.

* * * * *